US012586936B2

(12) United States Patent
Motosugi et al.

(10) Patent No.: US 12,586,936 B2
(45) Date of Patent: Mar. 24, 2026

(54) BATTERY POST TERMINAL ASSEMBLY

(71) Applicants: FURUKAWA ELECTRIC CO., LTD., Tokyo (JP); FURUKAWA AUTOMOTIVE SYSTEMS INC., Inukami-gun (JP)

(72) Inventors: Norihito Motosugi, Inukami-gun (JP); Hiroyuki Tokai, Inukami-gun (JP); Daisuke Takahashi, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 268 days.

(21) Appl. No.: 18/472,351

(22) Filed: Sep. 22, 2023

(65) Prior Publication Data

US 2024/0014583 A1 Jan. 11, 2024

Related U.S. Application Data

(63) Continuation of application No. PCT/JP2022/013024, filed on Mar. 22, 2022.

(30) Foreign Application Priority Data

Mar. 23, 2021 (JP) ................................ 2021-049104

(51) Int. Cl.
*H01R 11/28* (2006.01)

(52) U.S. Cl.
CPC ......... *H01R 11/283* (2013.01); *H01R 11/286* (2013.01)

(58) Field of Classification Search
None
See application file for complete search history.

(56) References Cited

U.S. PATENT DOCUMENTS 5,547,403 A * 8/1996 Haberstroh .......... H01R 11/283 439/763
7,166,001 B2 * 1/2007 Detter .................. H01R 11/283 439/762

(Continued)

FOREIGN PATENT DOCUMENTS

CN 110473994 A 11/2019
EP 2 940 758 A1 11/2015

(Continued)

OTHER PUBLICATIONS

European Office Action issued May 8, 2025 in European Patent Application No. 22775554.3, 7 pages.

(Continued)

*Primary Examiner* — Felix O Figueroa
(74) *Attorney, Agent, or Firm* — Oblon, McClelland, Maier & Neustadt, L.L.P.

(57) ABSTRACT

A battery post terminal assembly includes a battery post terminal including a grasping portion capable of grasping a battery post on an inner side, and a fastening portion placed in a form of a pair to extend from end portions of the grasping portion, a holder placed on one side of the fastening portion, and a base member placed on an opposite side to the holder with the fastening portion between the holder and the base member. The base member has a base seat portion, a screw shaft that is provided on one surface of the base seat portion to be coupled to the holder, and a projection portion that is provided on a surface having the screw shaft of the base seat portion, and to project to an inner side of the fastening portion when coupled to the holder.

8 Claims, 8 Drawing Sheets

(56) References Cited

U.S. PATENT DOCUMENTS

| | | | | | |
|---|---|---|---|---|---|
| 9,590,325 | B2 * | 3/2017 | Tanigawa | ............ | H01M 50/567 |
| 9,979,104 | B2 * | 5/2018 | Falchetti | .............. | H01R 13/641 |
| 10,418,615 | B2 * | 9/2019 | Tsukiyoshi | .......... | H01M 50/567 |
| 2017/0214029 | A1 | 7/2017 | Tsukiyoshi et al. | | |
| 2018/0342819 | A1 | 11/2018 | Nobukuni | | |

FOREIGN PATENT DOCUMENTS

| | | | | | |
|---|---|---|---|---|---|
| JP | 2015-011792 | A | 1/2015 | | |
| JP | 2017-134958 | A | 8/2017 | | |
| JP | 2017-142993 | A | 8/2017 | | |
| JP | 2018-125233 | A | 8/2018 | | |
| JP | 2020-161292 | A | 10/2020 | | |
| KR | 10-1377048 | B1 | 3/2014 | | |
| KR | 101758129 | B1 * | 7/2017 | .............. | H01M 2/30 |

OTHER PUBLICATIONS

International Search Report and Written Opinion issued May 31, 2022, in PCT/JP2022/013024 (with English Translation), 13 pages.
Extended European Search Report issued Oct. 1, 2024, in corresponding European Patent Application No. 22775554.3, 9 pages.
Second Office Action dated Nov. 13, 2025 in the corresponding Japanese Patent Application No. 2023-509176, with machine full translation, 7 pages.

* cited by examiner

BATTERY POST TERMINAL ASSEMBLY

CROSS REFERENCE TO RELATED APPLICATIONS

The present application is a continuation application of International Application No. PCT/JP2022/013024, filed on Mar. 22, 2022, which claims priority to Japanese Patent Application No. 2021-049104, filed on Mar. 23, 2021. The contents of these applications are incorporated herein by reference in their entirety.

TECHNICAL FIELD

The present invention relates to a battery post terminal assembly.

BACKGROUND ART

In general, a battery to be mounted on a vehicle such as an automobile is provided with a battery post that protrudes from a top surface of the battery, and a battery post terminal is fixed to the battery post. Harnesses for power supply are connected to the battery post terminal. As a structure for fixing the battery post terminal to the battery post, there is a structure in which a side wall part tapered surface that is inclined with respect to a screw shaft is formed on a base member, and an inclined surface oriented to correspond to the side wall part tapered surface is formed on a fastening portion (for example, see Japanese Patent Application Publication No. 2017-142993).

SUMMARY OF INVENTION

Technical Problem

Incidentally, in the battery post terminal assembly, fastening that exceeds specified torque to the base member may be performed, or fastening may be performed in a state where oil for rust proof is attached between the base member and the nut.

Accordingly, there is a need to restrain deformation during fastening more than in the conventional battery post terminal assemblies.

The present invention is made in view of the aforementioned problem, and it is an object of the present invention to provide a battery post terminal assembly that can restrain deformation of a battery post terminal.

Solution to Problem

A battery post terminal assembly according to a typical embodiment of the present invention includes a battery post terminal including a grasping portion capable of grasping a battery post on an inner side, and a fastening portion placed in a form of a pair to extend from end portions of the grasping portion, a holder to be placed on one side of the fastening portion, and a base member to be placed on an opposite side to the holder with the fastening portion between the holder and the base member, wherein the base member includes a base seat portion, a screw shaft that is provided on one surface of the base seat portion to be coupled to the holder, and a projection portion that is provided on the surface having the screw shaft of the base seat portion, and is to project to an inner side of the fastening portion when coupled to the holder.

In the battery post terminal assembly, the projection portion contacts at least a part of an inner side of a recessed part of the fastening portion when the holder and the base member are coupled to each other.

In the battery post terminal assembly, the projection portion includes a first side wall part that contacts at least a part of the inner side of the recessed part when the holder and the base member are coupled to each other.

In the battery post terminal assembly, the fastening portion contacts the projection portion or the first side wall part by fastening the holder to the screw shaft, and the projection portion restrains the fastening portion from deforming outward in a radial direction of the screw shaft.

In the battery post terminal assembly, a plurality of the projection portions are provided on a surface of the screw shaft on the base seat portion.

In the battery post terminal assembly, a pair of the projection portions are placed with the screw shaft as a center.

In the battery post terminal assembly, the projection portions are each in a step shape in contact with the screw shaft.

In the battery post terminal assembly, the base member includes a second side wall part that contacts at least a part of an outer side of the fastening portion when the holder and the base member are coupled to each other.

Effect of Invention

According to the battery post terminal assembly according to the present invention, it is possible to provide the battery post terminal assembly capable of restraining deformation of the battery post terminal.

DESCRIPTION OF EMBODIMENT

Hereinafter, a battery post terminal assembly 1 according to an embodiment of the present invention will be described by using the drawings.

Figure 1:
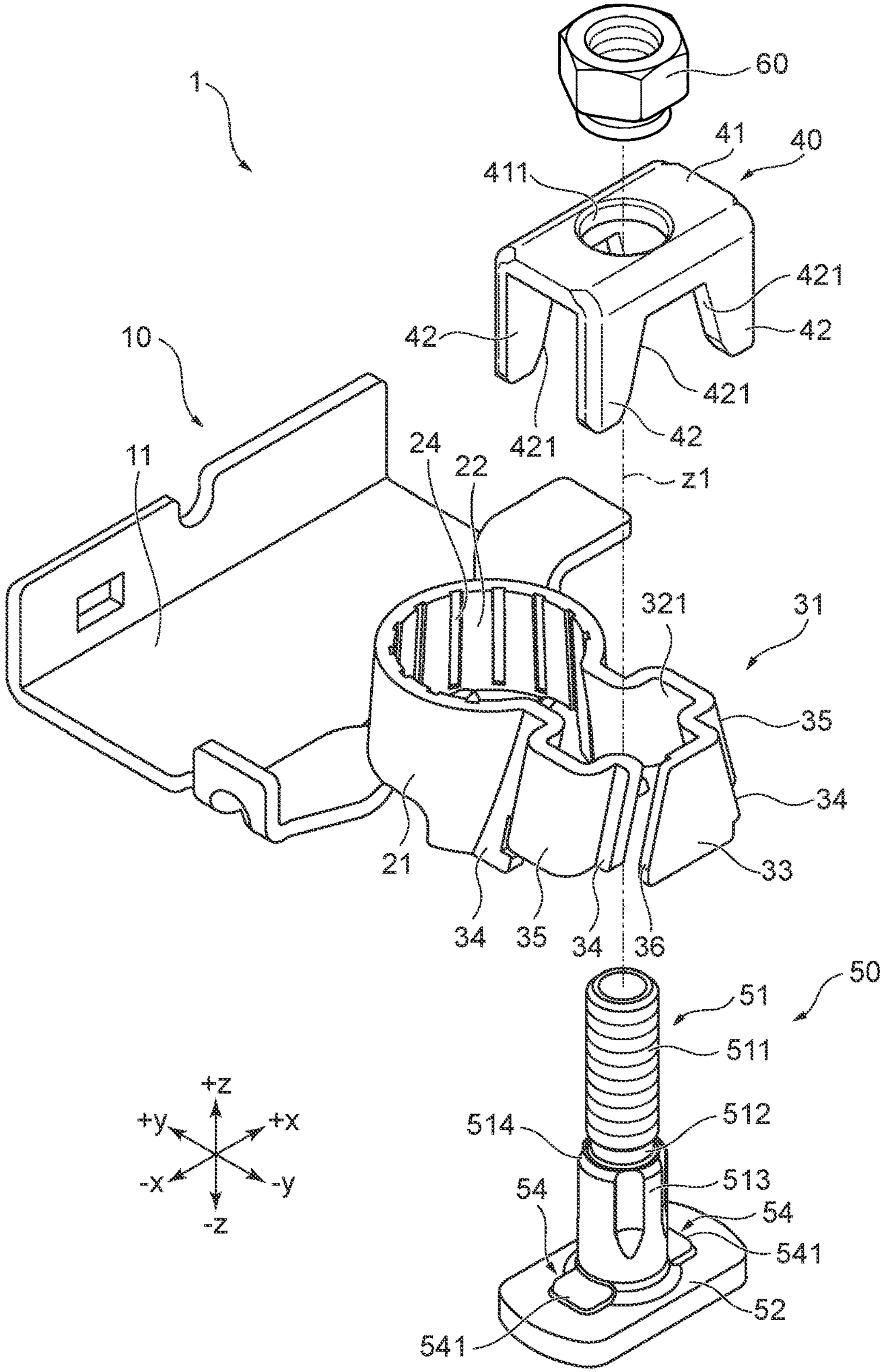
FIG. 1 is an exploded perspective view of a battery post terminal assembly according to an embodiment.

FIG. 1 is an exploded perspective view of the battery post terminal assembly 1 according to the embodiment. As shown in FIG. 1, the battery post terminal assembly 1 includes a battery post terminal 10 having a grasping portion 21 capable of grasping a battery post on an inner side, and a fastening portion 31 placed in a form of a pair to extend from end portions of the grasping portion, a holder 40 to be placed on one side of the fastening portion 31, and a base member 50 to be placed on an opposite side to the holder 40 with the fastening portion 31 sandwiched between the holder 40 and the base member 50. The base member 50 has a base seat portion 52, a screw shaft 51 that is provided on one surface of the base seat portion 52 to be coupled to the holder 40, and a projection portion 54 provided on a surface having the screw shaft 51 of the base seat portion 52 to project to an inner side of the fastening portion 31 when coupled to the holder 40. Hereinafter, the battery post terminal assembly 1 will be specifically described.

Hereinafter, for convenience of explanation, a direction along a side surface of the battery post terminal 10 in the battery post terminal assembly 1 in FIG. 1, that is, a direction parallel with a direction (Hereinafter, also referred to as an axial direction) of an axis z1 of the screw shaft 51 of the base member 50 with which the battery post terminal 10 engages will be defined as a z axis direction. The axis z1 direction is also referred to as an up-down direction. One of directions that are orthogonal to the axis z1 of the battery post terminal assembly 1 (x axis direction) is defined as a left-right direction. The x axis direction is also a horizontal direction in the battery post terminal assembly 1. Further, another direction (y axis direction) of the directions orthogonal to the axis z1 of the battery post terminal assembly 1 is defined as a front-back direction. In the battery post terminal assembly 1, a−y direction is also referred to as a front side, and a+y direction is also referred to as a back side. In the battery post terminal assembly 1, a direction perpendicular to the axis z1 direction of the screw shaft 51 is also referred to as a radial direction of the screw shaft 51. Further, in the battery post terminal assembly 1, a direction viewed from the −y direction to the +y direction is defined as a front direction. When positional relationships and directions of respective components are described as a right side, a left side, a front side, a rear side, an upper side, and a lower side in the following explanation, these positional relationships and directions only indicate the positional relationships and the directions in the drawings, and are not intended to limit the positional relationships and the directions of the actual battery post terminal assembly.

As shown in FIG. 1, the battery post terminal assembly 1 is configured by fastening and assembling the battery post terminal 10 and the holder 40 in the up-down direction by using the base member 50 and a nut 60 as a fastening member.

Figure 2:
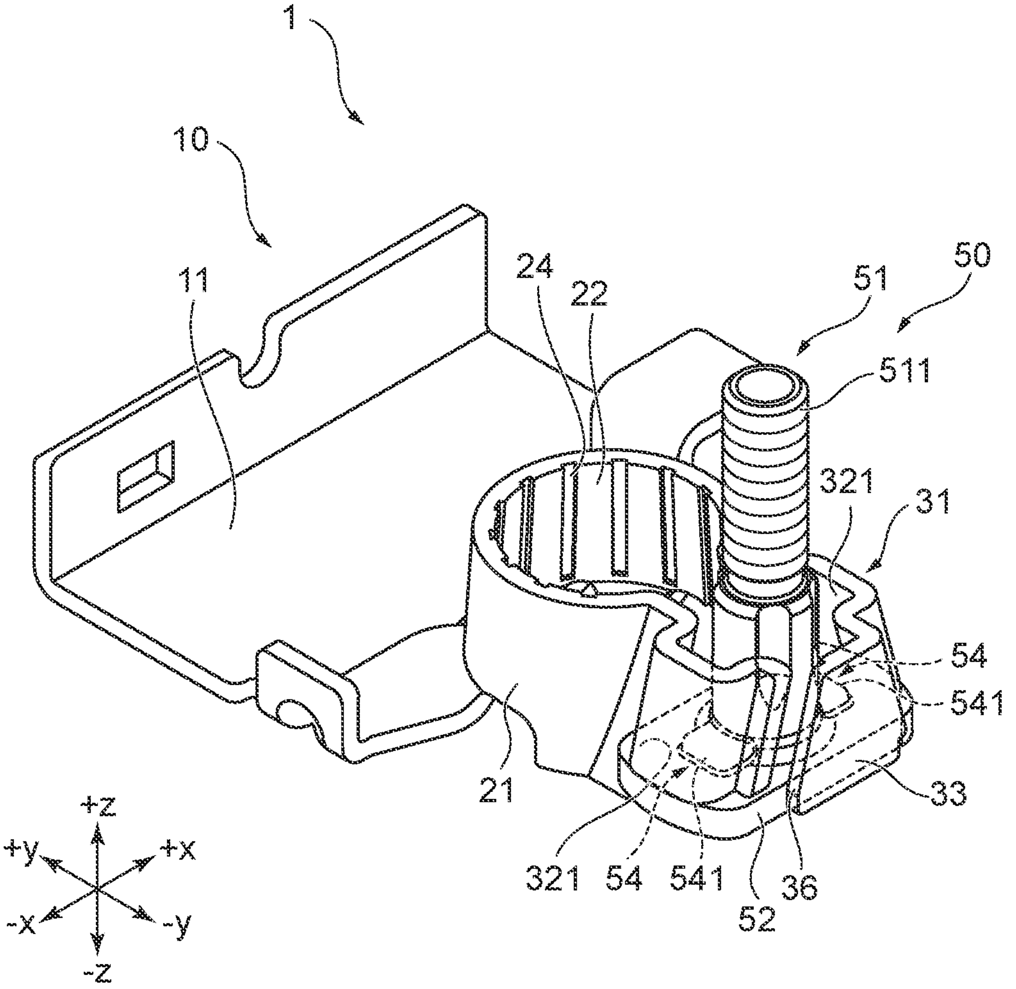
FIG. 2 is a perspective view showing a state where a battery post terminal and a base member of the battery post terminal assembly according to the embodiment contact each other.

FIG. 2 is a perspective view showing a state where the battery post terminal 10 and the base member 50 of the battery post terminal assembly 1 contact each other. Further, FIG. 3 is a perspective view showing the base member 50 of the battery post terminal assembly 1.

Figure 3:
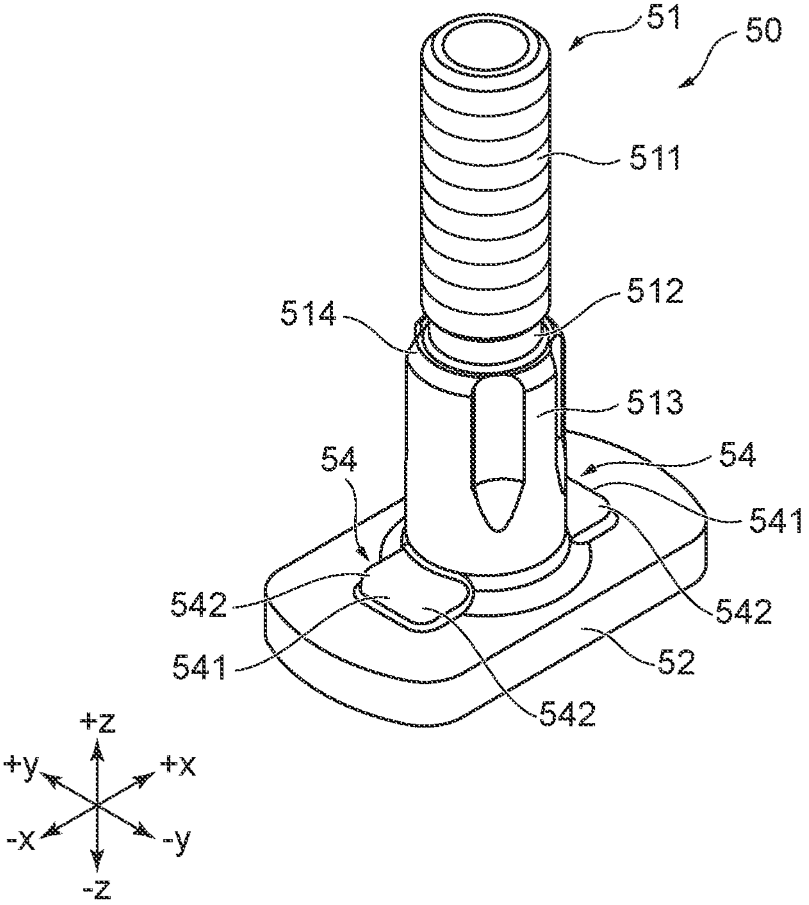
FIG. 3 is a perspective view showing the base member of the battery post terminal assembly according to the embodiment.

As shown in FIG. 1 to FIG. 3, the battery post terminal 10 is formed of a metal material having conductivity. In the battery post terminal 10, a connection portion 11 positioned on a back side in FIG. 1, the grasping portion 21 positioned on a front side of the connection portion 11, and the fastening portion 31 positioned further on a front side from the grasping portion 21 are integrally composed.

The connection portion 11 is incorporated into a case of a detection sensor of a battery condition detection device not illustrated. A harness for electric components not illustrated is mounted in a mode in which the detection sensor is interposed therebetween. A shape of the connection portion 11 is arbitrarily formed according to a mounting structure in the detection sensor. Further, the connection portion 11 also functions as a structure member that supports the detection sensor.

The grasping portion 21 fixes the battery post terminal 10 to the battery post not illustrated. The grasping portion 21 is formed into an annular shape, in other words, an arc shape, having an insertion space in a truncated cone shape on an inner side according to the shape of the battery post. The insertion space is configured so that the battery post not illustrated and formed into a truncated cone shape can be inserted therein. Note that in the following explanation, a center axis of the insertion space formed into the truncated cone shape may be referred to as an insertion axis. An inner peripheral surface 22 of the grasping portion 21 inclines to contact an inclining outer peripheral surface of the battery post, on the surface thereof. Further, on the inner peripheral surface 22, a plurality of grooves 24 are provided at intervals in a circumferential direction. The grooves 24 are formed to be substantially along the insertion axis. By the grooves 24, the grasping portion 21 increases a fastening force for sandwiching the outer peripheral surface of the battery post. The grasping portion 21 is attached so as to cover the battery post with the inner peripheral surface 22 from an upper side of the battery post.

Further, the grasping portion 21 is formed continuously from and integrally with the connection portion 11 in a part on the back side, but is in a shape branched (divided) into a left and a right with the inner peripheral surface 22 therebetween, on the front side. The fastening portion 31 is formed to be a pair to extend to the front side from respective tip end portions of the grasping portion 21 branched into the left and right.

The fastening portion 31 is specifically composed of an extension portion 32 on a left side extending from a left side of the grasping portion 21 to the front side, and an extension portion 32 on a right side that is placed with a space provided on a left and a right from the extension portion 32 on the left side and an inner peripheral surface 321 of the extension portion 32 with the axis z1 of the base member 50 therebetween, and extends to the front side from a tip end portion on the right side. The space is formed between the pair of extension portions 32, and by causing the extension portions 32 to move close to each other, the grasping portion 21 is deformed so that a diameter of the insertion space decreases, and thereby the battery post can be clamped and grasped. Note that the fastening portion 31 is in a laterally symmetrical shape with the axis z1 therebetween, and in the following explanation, only a structure of the left side of the fastening portion 31 will be described, and a structure on the right side will be omitted unless otherwise mentioned.

In the extension portion 32, an inclined surface 34 that inclines to the right or to the left so as to approach the axis z1 as progress to an upper side from a lower side is formed, when viewed from the front side. Further, as shown in FIG. 1, a boss portion 35 expanded in a substantially U-shape from an inner side to an outer side is formed at a center upper portion in the front-rear direction of the inclined surface 34. As shown in FIG. 2, a position of the boss portion 35 corresponds to a position where the screw shaft 51 is inserted in a state where the base member 50 is attached. Further, the boss portion 35 is formed to protrude to an outward direction toward a space between leg portions 42 adjacent in the front-rear direction, in a state where the holder 40 is assembled to the fastening portion 31.

The extension portion 32 has elasticity, and is configured to elastically move to the left and right with a portion on the back side of the grasping portion 21 as a base end portion. A bent portion 33 in which an end portion 36 is bent substantially perpendicularly toward the left direction is formed at a tip end on the front side of the extension portion 32 on the right side. The bent portion 33 extends to a position where an end portion 36 is in close vicinity to an end portion of the inclined surface 34 on the front side of the extension portion 32 on the left side. In the bent portion 33, a length in the left-right direction is bent so as to cover the inner peripheral surface 321 on the inner side of the extension portion 32 from a front side.

As shown in FIG. 1, the holder 40 is attached to cover the fastening portion 31 from an upper side of the fastening portion 31 of the battery post terminal 10. The holder 40 has a top surface portion 41 in a substantially rectangular shape, four leg portions 42 extending to a lower side from respective four corner portions of the top surface portion 41, and an insertion hole 411 provided in a center portion of the top surface portion 41. As for lengths of sides of the top surface portion 41, sides in the front-rear direction are formed to be shorter than sides in the left-right direction. The screw shaft 51 of the base member 50 described later is inserted through the insertion hole 411. The four leg portions 42 are disposed symmetrically in the front-rear direction and the left-right direction with the insertion hole 411 as a center, and a space between the leg portions 42 in the front-rear direction is narrower than a space between the leg portions in the left-right direction. Further, a top surface of the top surface portion 41 is formed into a planar shape so that the nut 60 is stably fastened.

Slopes 421 are formed respectively on inner sides on the left and right of the leg portions 42. The slopes 421 are formed at same inclination angles as inclination angles of the inclined surfaces 34 of the extension portions 32 on the left and right, and the inclined surfaces 34 and the slopes 421 contact each other on the surfaces thereof in a state where the holder 40 is assembled to the fastening portion 31.

A lower end of the leg portion 42 is configured to be butted to a top surface of the base seat portion 52 of the base member 50 in a state where the nut 60 is completely fastened. In other words, a length of the leg portion 42 is determined in relation to fastening torque when fastening the nut 60, and by fastening until the four leg portions 42 are butted, excessive torque is prevented.

Further, the leg portions 42 of the holder 40 are placed at intervals along an outer periphery of the screw shaft 51 around the screw shaft 51 of the base member 50, and are placed substantially evenly in a well-balanced manner so as to surround an outside of the screw shaft 51 when the state where the holder 40 is attached is viewed from the vertical direction.

As shown in FIG. 1 to FIG. 3, the base member 50 is composed of the screw shaft 51 extending in the up-down direction, the base seat portion 52 positioned on a lower side of the screw shaft 51, and the projection portions 54 provided on the base seat portion 52.

The screw shaft 51 includes a male screw portion 511 in which a screw thread is formed in a predetermined length range from a tip end portion facing the upper side, a step portion 513 as a restriction member that restricts movement of the holder 40, and a small-diameter portion 512 provided between the male screw portion 511 and the step portion 513. In the base member 50, the small-diameter portion 512 and the step portion 513 function as restriction members that restrict movement in the axis z1 direction of the holder 40.

The base member 50 is a so-called stepped base member in which the step portion 513 having no screw thread is provided in a predetermined length range on a base end side of the screw shaft 51, that is, on a base seat portion 52 side.

The base seat portion 52 is a member, for example, in a rectangular plate shape or a substantially plate shape having a surface extending in perpendicular directions (the x axis direction and the y axis direction) to the axis z1 direction. The base seat portion 52 has such dimensions in the x axis direction and the y axis direction that lower ends of the extension portions 32 of the fastening portion 31, and lower ends of the leg portions 42 of the holder 40 can contact the base seat portion 52 in a state where the nut 60 is fastened to the screw shaft 51. The base seat portion 52 is joined to the screw shaft 51 in a base end portion on a step portion 513 side where the male screw portion 511 of the screw shaft 51 is not provided.

The projection portion 54 is provided on a surface on an upper side in the base seat portion 52, that is, on a surface where the screw shaft 51 is provided. The projection portion 54 is provided, for example, at a junction spot of the base end portion on the step portion 513 side of the screw shaft 51 and the base seat portion 52, on the surface on the upper side of the base seat portion 52. The projection portion 54 is provided to contact the step portion 513 of the screw shaft 51. The projection portion 54 is in a step shape projecting from the base seat portion 52. Specifically, the projection portion 54 projects to the upper side from the base seat portion 52 in the z axis direction, and projects to the outer side in the x axis direction and the y axis direction, respectively. In the projection portion 54, a surface on the outer side in the x axis direction functions as a side wall part 541. A plurality of projection portions 54 are provided to form a pair around the axis z1 of the screw shaft 51.

Thereafter, an operation of the battery post terminal assembly 1 in the embodiment will be described.

In the battery post terminal assembly 1, a state before the nut 60 is fastened is a state where the holder 40 is put on the fastening portion 31. The slope 421 of the holder 40 contacts the inclined surface 34 of the fastening portion 31 on the surface thereof. Further, the base member 50 is inserted from a lower side of the fastening portion 31, and the screw shaft 51 is inserted through the insertion hole 411 of the holder 40 through the space (in more detail, a space between the boss portions 35 on the left and right) of the inner peripheral surfaces 321 of the extension portions 32 on the left and right, and is temporarily fastened with the nut 60.

A position in the left-right direction of the holder 40 is restricted by the slopes 421 and the inclined surfaces 34 respectively contacting on the surfaces thereof. Further, the position in the front-rear direction is restricted by the inner side surfaces in the front-rear direction of the holder 40 and the boss portions 35 of the fastening portion 31 respectively contacting each other. Further, the position in the front-rear direction of the holder 40 is also restricted by the inner side surfaces in the front-rear direction of the leg portions 42 and the boss portions 35. A position of the base member 50 is restricted by the outer peripheral surface in the left-right direction of the holders 40 and the surface on the upper side of the base seat portion 52 contacting each other.

When the nut 60 is fastened from the upper side of the holder 40 from the state shown in FIG. 1 and FIG. 2, the holder 40 moves in the axis z1 direction, specifically, in the −z direction (fastening direction of the base member 50) to the lower side while being guided by surface contact on the left and right of the slopes 421 and the inclined surfaces 34. In addition, the slopes 421 press the inclined surfaces 34 of the extension portions 32 on the left and right in the +x direction or −x direction to the inner side by moving in the axis z1 direction. Thereby, the extension portions 32 on the left and right elastically deform inward so that a space in the left-right direction of the inner peripheral surfaces 321 of the left and right extension portions 32 is narrowed, and the battery post in the inner peripheral surface 22 of the grasping portion 21 is fastened and fixed.

Since the inclined surfaces 34 and the slopes 421 press the extension portions 32 while contacting on surfaces, the fastening force of the nut 60 is stably transmitted to the extension portions 32, and the extension portions 32 are pressed in a well-balanced manner.

Since the leg portions 42 are placed at intervals along the outer periphery of the screw shaft 51 around the screw shaft 51 of the base member 50, and are disposed substantially evenly to surround the outside of the screw shaft 51 when the battery post terminal 10 is viewed from the perpendicular direction, the leg portions 42 press the extension portions 32 on the left and right inward with substantially equal forces. Thereby, even when forces act on the screw shaft 51 after fastening the base member 50 and the nut 60 from many directions, uniform fixing strength can be ensured in any direction.

In the base member 50, the holder 40 moves in the axis z1 direction, specifically, in the −z axis direction to the lower side by the male screw portion 511 of the screw shaft 51. Specifically, in the base member 50, the nut 60 screwed onto the male screw portion 511 from a tip end side of the screw shaft 51 moves in the fastening direction of the male screw portion 511, that is, in the −z1 direction, whereby the top surface portion 41 of the holder 40 that is in contact with the nut 60 is pressed and the holder 40 moves in the axis z1 direction. Since the male screw portion 511 is formed in the predetermined length range from the tip end portion of the screw shaft 51, the nut 60 and the holder 40 move in the axis z1 direction in the range of the length of the male screw portion 511.

When the nut 60 reaches the base end side, that is, a lower end of the male screw portion 511, the nut 60 idles because a screw thread capable of being screwed in the nut 60 is not formed on the small-diameter portion 512 and the step portion 513 of the screw shaft 51. In this manner, the base member 50 restricts the nut 60 and the holder 40 movable with the nut 60 from moving in the axis z1 direction, specifically, the −z axis direction on the lower side because the small-diameter portion 512 and the step portion 513 are formed.

Figure 4:
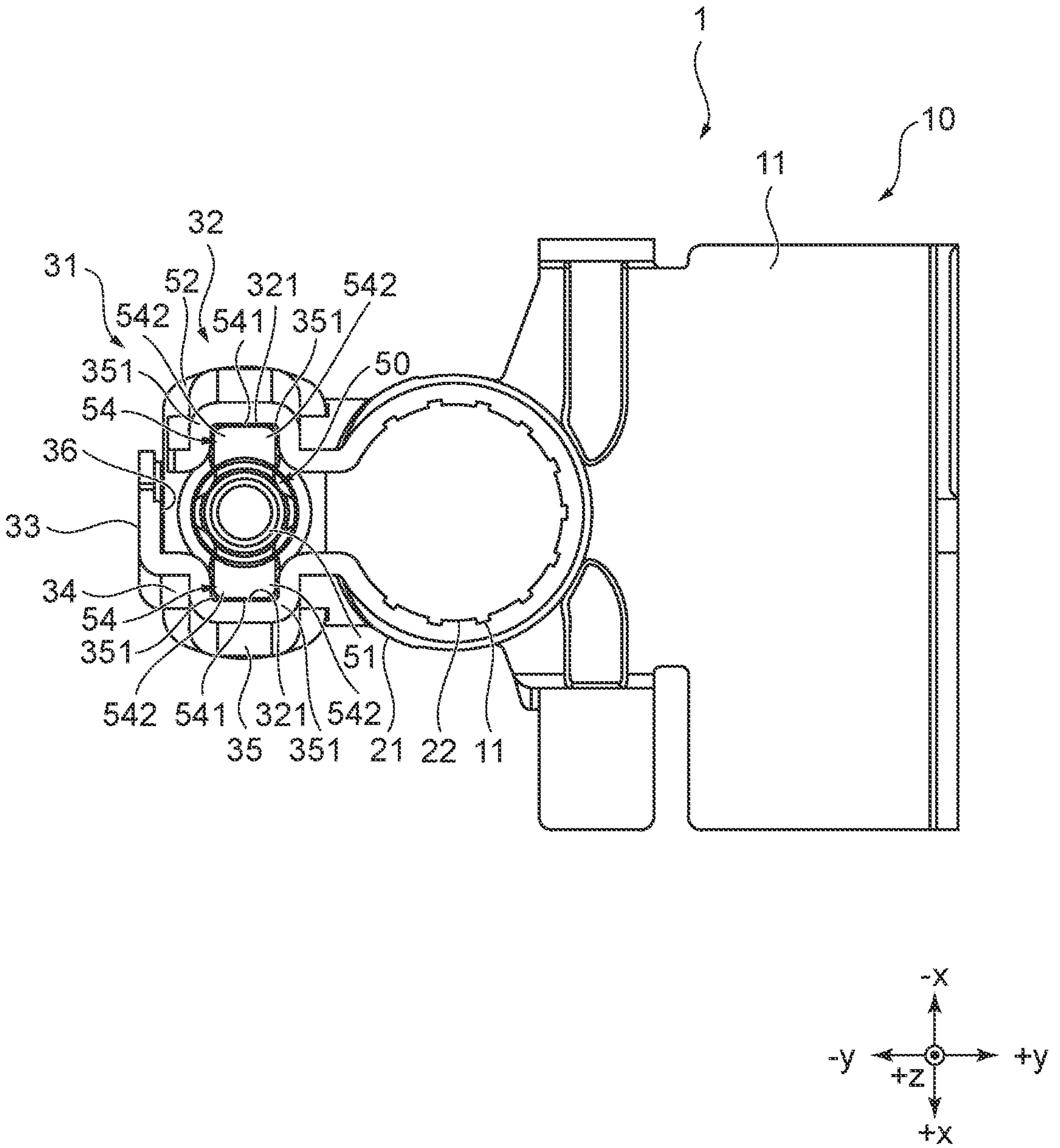
FIG. 4 is a schematic view showing the state where the battery post terminal and the base member of the battery post terminal assembly according to the embodiment contact each other.

FIG. 4 is a schematic view showing a state where the battery post terminal 10 and the base member 50 of the battery post terminal assembly 1 contact each other.

As shown in FIG. 4, the projection portion 54 contacts at least a part of the inner side of a recessed part (extension portion 32) of the fastening portion 31 when the holder 40 and the base member 50 are coupled to each other. In the projection portion 54, the side wall part 541 on the outer side in the x axis direction contacts a surface (inner peripheral surface 321) on the inner side of the projection portion 32. Since the projection portion 54 is provided, deformation to the inner side of the fastening portion 31 is restrained when the fastening portion 31 deforms to the inner side by fastening the holder 40 to the screw shaft 51. Specifically, when the nut 60 is fastened from the upper side of the holder 40 (see FIG. 1), the slopes 421 of the holder 40 move in the axis z1 direction as described above, and thereby the inner peripheral surfaces 321 of the extension portions 32 on the left and right elastically deform to the inner side so that the space in the left-right direction of the inner peripheral surfaces 321 is narrowed. When the inner peripheral surfaces 321 of the extension portions 32 elastically deform to the inner side, the side wall parts 541 extending in the y axis direction of the projection portions 54 of the base member 50 that is positioned inside of the extension portions 32 contact the inner peripheral surfaces 321. In the battery post terminal assembly 1, the side wall parts 541 of the projection portions 54 of the base member 50 contacts the inner peripheral surface 321 of the extension portions 32, and thereby can restrain deformation of the extension portions 32 and can restrain deformation of the (entire) fastening portion 31. Further, in the battery post terminal assembly 1, when fastening the nut 60 with the holder 40, end portions 542 of the side wall parts 541 contact the corner portions 351 on the inner side of the boss portions 35 expanded in a substantially U-shape toward the outer side from the inner side, in the projection portions 54 of the base member 50. In the battery post terminal assembly 1, the end portions 542 of the projection portions 54 and the corner portions 351 on the inner side of the boss portions 35 contact each other, and thereby the end portions 542 and the corner portions 351 serve as restriction points when fastening the nut 60 to the screw shaft 51 of the base member 50. The battery post terminal assembly 1 can restrain deformation of the extension portions 32 since the end portions 542 and the corner portions 351 serve as the restriction points. Specifically, the end portions 542 and the corner portions 351 serve as the restriction points, and thereby can restrain the end portion 36 and the bent portion 33 from opening outward (−y axis direction) in the radial direction of the screw shaft 51 as a result of the fastening portion 31 extends.

In the battery post terminal assembly 1 according to the embodiment of the present invention, the small-diameter portion 512 and the step portion 513 as the restriction members that restrict movement in the axis z1 direction of the holder 40 that moves with the nut 60 are provided at the screw shaft 51 of the base member 50. According to the battery post terminal assembly 1 configured like this, even when fastening exceeding the specified torque to the base member 50 is performed, or fastening is performed in the state where oil for rustproof is attached between the base member 50 and the nut 60, the battery post terminal can be restrained from deforming more than necessary by the positions in the axis z1 direction of the nut 60 and the holder 40 provided in the battery post terminal assembly 1 lowering more than necessary.

The battery post terminal assembly 1 according to the embodiment of the present invention is described above, but the present invention is not limited to the embodiment already described, and various modifications and changes can be made based on the technical idea of the present invention.

Figure 5:
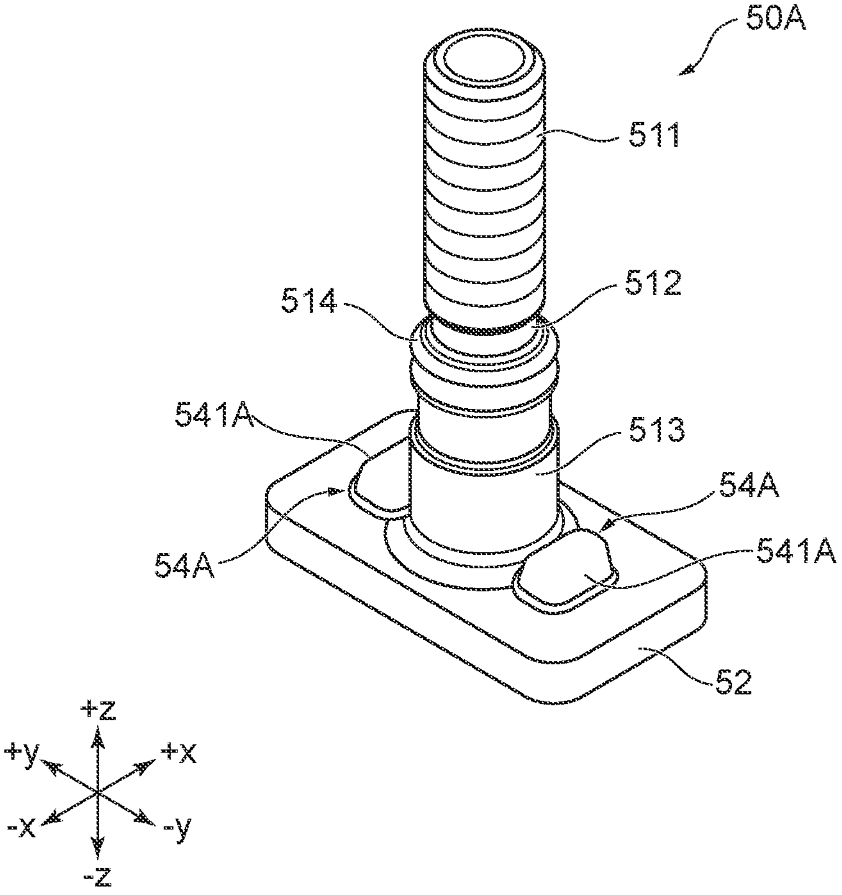
FIG. 5 is a perspective view showing the base member of the battery post terminal assembly according to variant 1 of the embodiment.

FIG. 5 is a perspective view showing a base member 50A of a battery post terminal assembly 1 according to variant 1 of the embodiment.

For example, in the embodiment, the projection portion 54 is provided at the junction spot of the base end portion on the step portion 513 side of the screw shaft 51 and the base seat portion 52 on the surface on the upper side of the base seat portion 52, but the projection portion 54 is not limited to this. For example, like a projection portion 54A in a base member 50A of variant 1 in FIG. 5, the projection portion 54A can project upward in the z axis direction from a surface on an upper side of a base seat portion 52A. Further, the projection portions 54 and 54A each can project outward in at least either one direction of the x axis and y axis directions from an outer peripheral surface of the screw shaft 51. The projection portions 54 and 54A each may be provided at a position separated upward from the base seat portion 52, for example.

Further, in the embodiment, the projection portions 54 and 54A are placed in pairs with the axis z1 of the screw shaft 51 as the center, but the invention is not limited to this, and, for example, the projection portions 54 and 54A each may be one projection portion that projects outward in at least either one direction of the x axis and y axis directions from the screw shaft 51.

Figure 6:
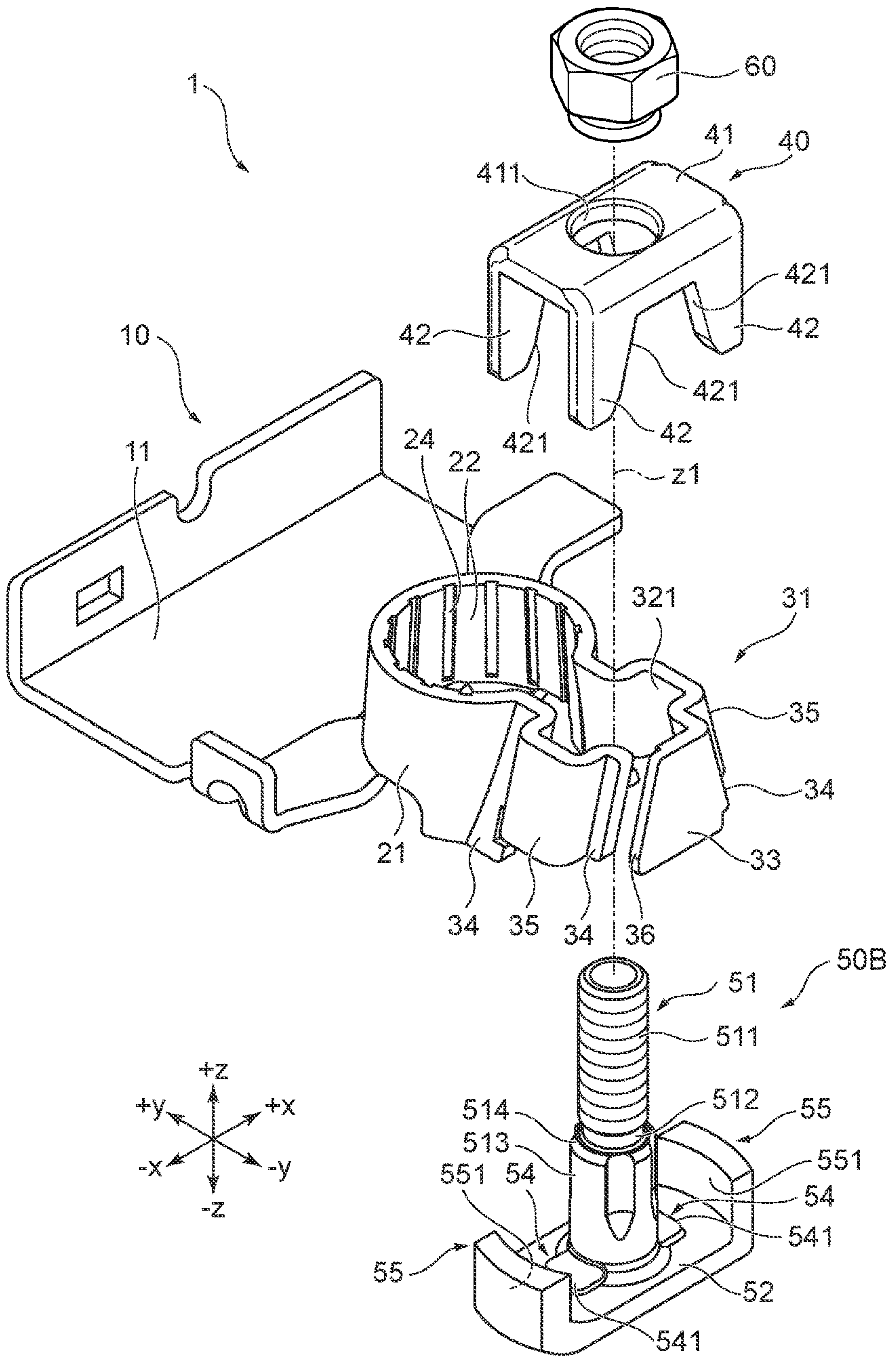
FIG. 6 is an exploded perspective view of a battery post terminal assembly according to variant 2 of the embodiment.
Figure 7:
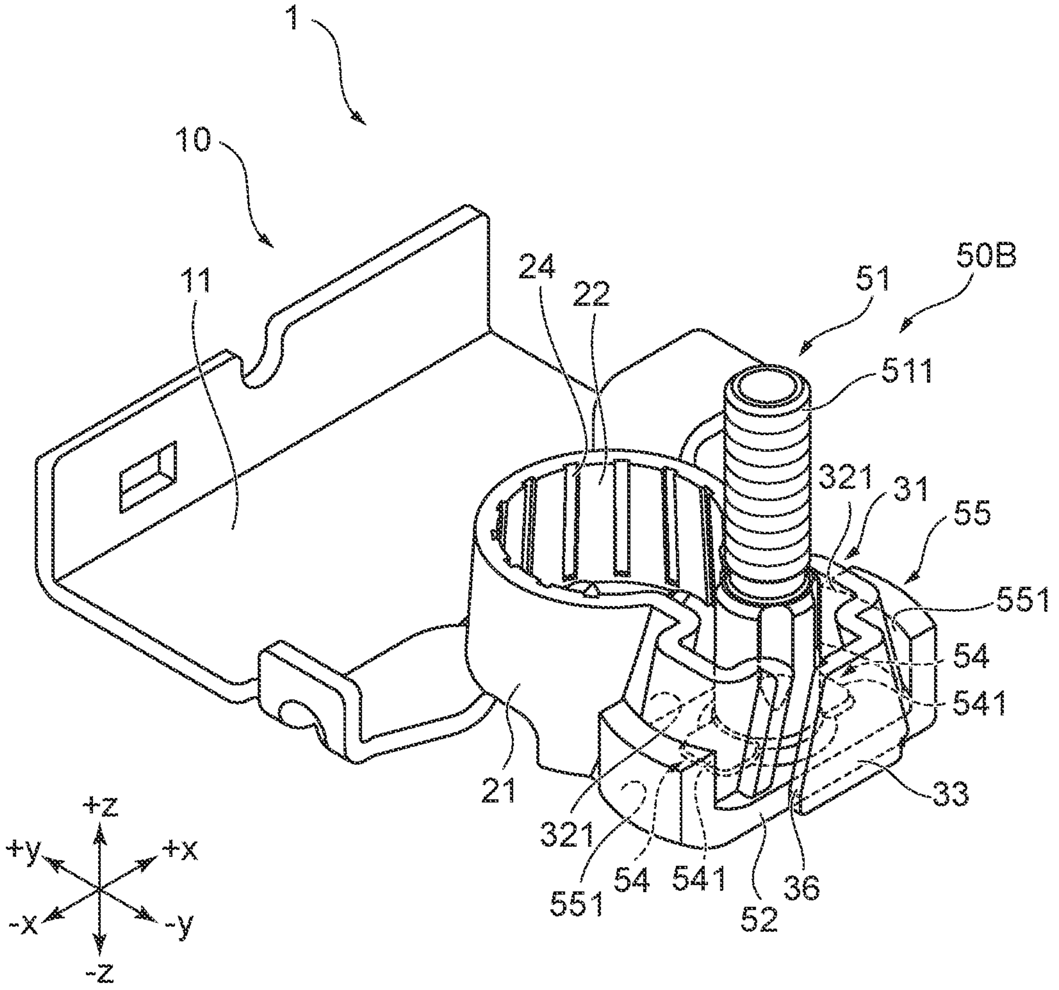
FIG. 7 is a perspective view showing a state where a battery post terminal and a base member of the battery post terminal assembly according to variant 2 contact each other.
Figure 8:
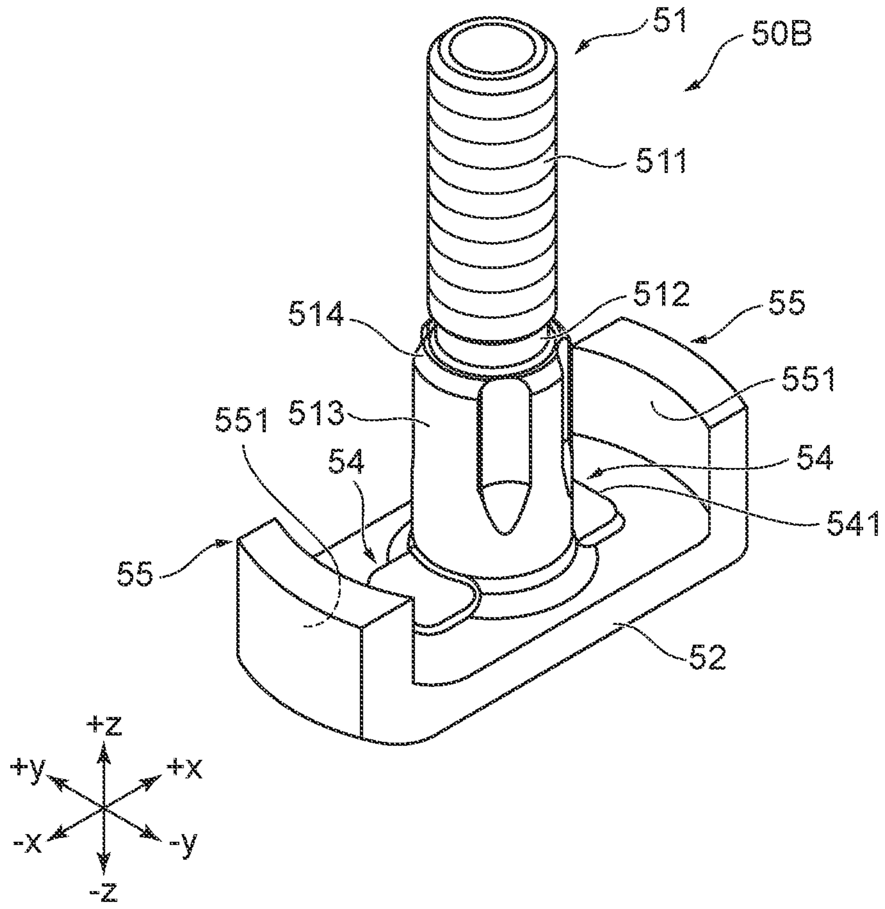
FIG. 8 is a perspective view showing the base member of the battery post terminal assembly according to variant 2.

FIG. 6 is an exploded perspective view of a battery post terminal assembly 1 according to variant 2 of the embodiment. FIG. 7 is a perspective view showing a state in which a battery post terminal 10 and a base member 50B of a battery post terminal assembly 1 contact each other. FIG. 8 is a perspective view showing the base member 50B of the battery post terminal assembly 1.

In the battery post terminal assembly 1 according to variant 2 shown in FIG. 6 to FIG. 8, the base member 50B differs from the base member 50 of the battery post terminal assembly 1 described above. Specifically, in the base member 50B, second side wall parts 55 are provided at end portions on outer sides in the x axis direction of the base seat portion 52.

The second side wall parts 55 are wall-shaped parts that are raised in an extension direction (+z axis direction) of the screw shaft 51 from the end portions on the outer sides in the x axis direction of the base seat portion 52. In the second side wall part 55, an inside surface 551 on an inner side contacts a surface on an outer side of the boss portion 35 in a state where the base member 50B is assembled to the battery post. In other words, in the battery post terminal assembly 1, inner peripheral surfaces 321 of extension portions 32 of the battery post and the projection portions 54 contact each other, and the outer surfaces of the boss portions 35 and the second side wall parts 55 contact each other, whereby the battery post terminal assembly 1 can further restrain the base member 50B from rotating in a fastening direction when fastening a nut 60.

The invention claimed is:

1. A battery post terminal assembly comprising:

a battery post terminal including a grasping portion capable of grasping a battery post on an inner side, and a fastening portion placed in a form of a pair to extend from end portions of the grasping portion;

a holder to be placed on one side of the fastening portion; and a base member to be placed on an opposite side to the holder with the fastening portion between the holder and the base member;

wherein the base member includes a base seat portion, a screw shaft that is provided on one surface of the base seat portion to be coupled to the holder, a projection portion that is provided on the surface having the screw shaft of the base seat portion and is to project to an inner side of the fastening portion when coupled to the holder, and a plurality of the projection portions that are provided on a surface of the screw shaft on the base seat portion.

2. The battery post terminal assembly according to claim 1, wherein the projection portion contacts at least a part of an inner side of a recessed part of the fastening portion when the holder and the base member are coupled to each other.

3. The battery post terminal assembly according to claim 2, wherein the projection portion includes a first side wall part that contacts at least a part of the inner side of the recessed part of the fastening portion when the holder and the base member are coupled to each other.

4. The battery post terminal assembly according to claim 1, wherein a corner portion on an inside of the fastening portion contacts an end portion of the projection portion by fastening the holder to the screw shaft, and the projection portion restrains the fastening portion from deforming outward in a radial direction of the screw shaft as the corner portion and the end portion serve as restriction points.

5. The battery post terminal assembly according to claim 1, wherein a pair of the projection portions are placed with the screw shaft as a center.

6. The battery post terminal assembly according to claim 1, wherein the projection portions are each in a step shape in contact with the screw shaft.

7. The battery post terminal assembly according to claim 1, wherein the base member includes a second side wall part that is to contact at least a part of an outer side of the fastening portion when the holder and the base member are coupled to each other.

8. The battery post terminal assembly according to claim 1, wherein the holder has a top surface portion in a substantially rectangular shape, four leg portions extending to a lower side from respective four corner portions of the top surface portion, and an insertion hole provided in a center portion of the top surface portion, wherein slopes are formed respectively on inner sides of the leg portions and at same inclination angles as inclination angles of inclined surfaces of extension portions of the fastening portion.

* * * * *